US011599986B2

(12) United States Patent
Afrasiabi et al.

(10) Patent No.: US 11,599,986 B2
(45) Date of Patent: Mar. 7, 2023

(54) SYNTHETIC IMAGE GENERATION FOR SURFACE ANOMALY DETECTION

(71) Applicant: The Boeing Company, Chicago, IL (US)

(72) Inventors: Amir Afrasiabi, Seattle, WA (US); William David Kelsey, Issaquah, WA (US)

(73) Assignee: The Boeing Company, Arlington, VA (US)

( * ) Notice: Subject to any disclaimer, the term of this patent is extended or adjusted under 35 U.S.C. 154(b) by 361 days.

(21) Appl. No.: 16/902,588

(22) Filed: Jun. 16, 2020

(65) Prior Publication Data

US 2021/0390674 A1    Dec. 16, 2021

(51) Int. Cl.
  *G06T 7/00*   (2017.01)
  *G06K 9/62*   (2022.01)
  *G06V 10/25*  (2022.01)

(52) U.S. Cl.
  CPC ............ *G06T 7/001* (2013.01); *G06K 9/6256* (2013.01); *G06T 7/97* (2017.01); *G06V 10/25* (2022.01)

(58) Field of Classification Search
  None
  See application file for complete search history.

(56) References Cited

U.S. PATENT DOCUMENTS

| 10,643,329 | B2 | 5/2020 | Afrasiabi et al. |
| 2009/0274386 | A1* | 11/2009 | Panetta .................... G06T 5/005 382/266 |
| 2017/0301078 | A1* | 10/2017 | Forutanpour ......... G06T 7/0004 |
| 2019/0118497 | A1* | 4/2019 | Kierbel .................... B29C 73/12 |
| 2020/0175669 | A1* | 6/2020 | Bian ..................... G06T 7/0004 |
| 2021/0034961 | A1* | 2/2021 | Lovell ................ G05B 19/4097 |
| 2021/0271019 | A1* | 9/2021 | Laffont .................... G01L 1/246 |
| 2022/0005175 | A1* | 1/2022 | Mansell ................ H04L 67/125 |

OTHER PUBLICATIONS

Luo et al., *Infrared Image Registration of Damage in the Aircraft Skin Based on Lie Group Machine Learning*, The 26th Chinese Control and Decision Conference (2014 CCDC) pp. 2104-2108, 2014.

* cited by examiner

*Primary Examiner* — Leon Q Nguyen
(74) *Attorney, Agent, or Firm* — Kolitch Romano Dascenzo Gates LLC

(57) ABSTRACT

Systems and methods for detecting surface anomalies are disclosed. For example, a computer-implemented method for detecting surface anomalies on an object comprises receiving measured electromagnetic radiation (EMR) profiles for the object, generating synthetic EMR profiles for the object based on the measured EMR profiles, determining whether the object contains a surface anomaly based on the measured EMR profiles and the synthetic EMR profiles, and indicating a surface anomaly to a user via a display when a surface anomaly is detected. In another example, a system comprises a computing device comprising non-transitory memory with computer-readable instructions for receiving unpaired image data of an object of two different image types, predicting missing image data to generate paired image data of the two different image types, and determining whether the object contains a surface anomaly based on the paired image data. The computing device comprises a processor configured to execute the computer-readable instructions.

20 Claims, 4 Drawing Sheets

SYNTHETIC IMAGE GENERATION FOR SURFACE ANOMALY DETECTION

FIELD

The present disclosure relates to systems and methods for detecting surface anomalies on objects such as aircraft parts.

BACKGROUND

Parts, materials, products, equipment, and other objects may be inspected for dents, bumps, abrasions, scratches, holes, and other surface anomalies to ensure their quality. For example, these inspections may be performed when parts are initially received from a supplier and/or after a product has been in service, such as when it is brought in for routine maintenance. In the context of aircraft, a fuselage skin may be inspected for surface anomalies during the manufacturing process, such as when it arrives at the manufacturer's final assembly facility. The fuselage also or alternatively may be inspected after the aircraft has been delivered and has been in service, such as between flights, during scheduled maintenance, etc.

Conventionally, these inspections are performed visually by human personnel. For example, ground personnel may walk around an aircraft's fuselage and perform a visual inspection of the fuselage skin to look for surface anomalies. However, it may be difficult for ground personnel to spot these surface anomalies because of the lighting, surface coating on the skin, and/or various other reasons. As such, these visual inspections may be unreliable and/or prone to error, leading to undiagnosed surface anomalies.

Some have proposed performing these inspections using thermal imagery. For example, surface anomalies on an aircraft skin may be detected based on how the skin's thermal profile changes under varying temperatures. However, such approaches still rely on actual observations (thermal images) of the aircraft skin, thus requiring a large batch of images. In reality, capturing this many images of the object (the number needed to perform the thermal imagery-based inspection) may be infeasible and/or impractical, especially once the aircraft is in service, making it difficult to carry out and/or complete such inspections. Further, such thermal inspection methods do not account for how changes in other ambient conditions besides temperature (such as humidity and lighting) may affect the thermal profiles of the object under inspection. Thus, the inspections may be unreliable, particularly when ambient conditions such as humidity and/or lighting vary over the course of the observation period.

Thus, more accurate and rigorous inspection and surface anomaly detection techniques are desired.

SUMMARY

Systems and methods for detecting surface anomalies on an object are disclosed. In one example, a computer-implemented method for detecting surface anomalies on an object comprises receiving measured electromagnetic radiation (EMR) profiles for the object, wherein the measured EMR profiles are captured by one or more EMR receivers at different ambient conditions, generating synthetic EMR profiles for the object based on the measured EMR profiles, determining whether the object contains a surface anomaly based on the measured EMR profiles and the synthetic EMR profiles, and responsive to determining that the object contains a surface anomaly, indicating the surface anomaly to a user via a display.

In another example, a method for detecting surface anomalies on an object comprises receiving two or more images of the object taken at different ambient conditions by one or more cameras, the two or more images comprising one or more of two different image types, calculating, for each of the two or more images, a paired image, wherein the paired image comprises the other of the two different image types, and determining whether the object contains a surface anomaly based on the received two or more images and the calculated paired images.

In yet a further example, a system comprises a computing device comprising non-transitory memory comprising computer-readable instructions for: receiving unpaired image data of an object, the unpaired image data comprising different image types, predicting missing image data to generate paired image data of the different image types, and determining whether the object contains a surface anomaly based on the paired image data. The computing device further comprises a processor configured to execute the computer-readable instructions.

DESCRIPTION

Figure 1:
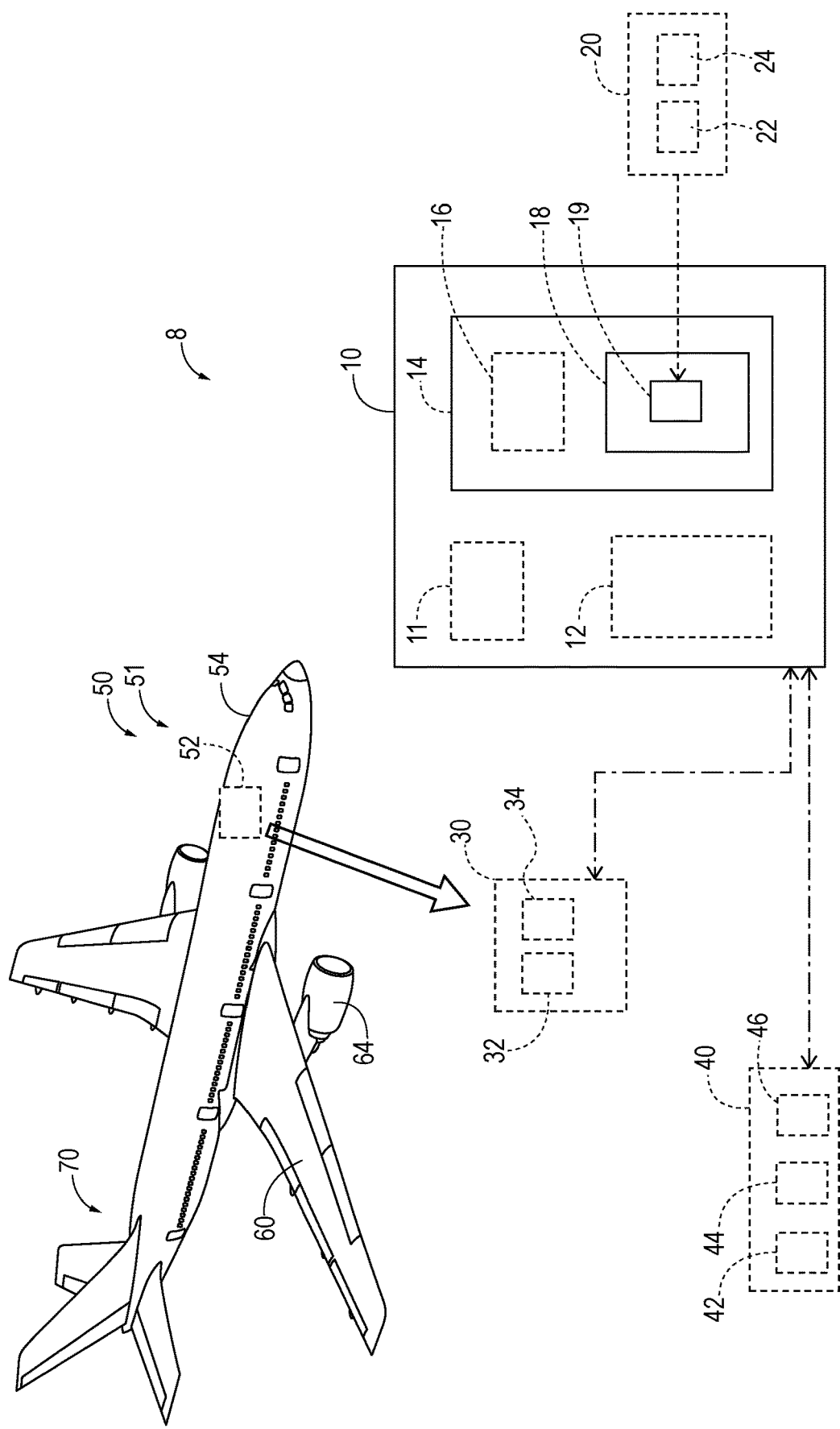
FIG. 1 is schematic representation of a system configured to detect surface anomalies on an object, such as an aircraft, according to the present disclosure.

Systems and methods for detecting surface anomalies on an object are disclosed. Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure. Further, dash-dot lines are used to illustrate electrical connections (wired or wireless connections) between elements.

FIGS. 1-4 illustrate systems and methods for detecting surface anomalies of an object. In particular, unlike conventional approaches that detect surface anomalies based only on camera-captured images of an object, the systems and methods of the present disclosure are configured to generate synthetic electromagnetic radiation (EMR) profiles of the object, and/or synthetic images representative of the synthetic EMR profiles of the object, based, at least in part, on the generated synthetic EMR profiles and/or images. By supplementing measured/observed EMR profiles and/or images with computer-generated synthetic EMR profiles and/or images, the systems and methods of the present disclosure require fewer measured EMR profiles and/or images of an object to complete an inspection of the object.

That is, the methods of the present disclosure may complete an inspection of an object and detect whether the object contains surface anomalies with fewer measured EMR profiles and/or images of the object than conventional approaches. As such, the systems and methods of the present disclosure do not require as many measurements and/or observations of the object in order to detect surface anomalies on the object.

The synthetic EMR profiles and/or images themselves may be generated by a machine learning algorithm that is programmed in the non-transitory memory of a computing device. In some examples, the synthetic EMR profiles and/or images are paired EMR profiles and/or images of measured EMR profiles and/or images of the object under inspection. In some such examples, the synthetic EMR profiles include a different EMR range than the measured EMR profiles and/or the synthetic images represent a different EMR range than the captured images. As an example, when a given captured image is an optical image, the paired synthetic image is a thermal image, and vice versa. In this way, the machine learning algorithm is configured to convert captured EMR profiles to a different range of EMR wavelength and/or to convert images of the object to a different image type (e.g., an optical image to a thermal image). Further, the EMR profiles and/or images are captured (also referred to herein as "observed" and/or "measured") at different ambient conditions because surface anomalies may be easier to detect as the ambient conditions change. As one example, as the ambient temperature varies, the EMR profiles of objects containing surface anomalies may deviate from what would be expected for an anomaly-free object. Thus, an ambient condition-varying series of images representing at least two different EMR ranges is compared to what would be expected for an anomaly-free object to determine whether the object contains any surface anomalies. As discussed above, by generating the synthetic images with the machine learning algorithm, the inspection and surface anomaly detection process may be completed with fewer observations of the object under inspection.

In some examples, the machine learning algorithm additionally accounts for changes in the ambient conditions when generating the synthetic EMR profiles and/or images. In particular, the machine learning algorithm may learn during training how changes in temperature, humidity, and/or lighting affect the EMR profiles of the object under inspection. By accounting for these changes when generating the synthetic EMR profiles and/or images, the machine learning algorithm may generate more accurate synthetic EMR profiles and/or images, thereby improving the reliability and accuracy of the surface anomaly detection during the inspection process.

FIG. 1 schematically illustrates an example of a system 8 configured to detect surface anomalies of an object 50, and in some examples, to detect surface anomalies of a portion (also referred to herein as "region" or "region of interest") 52 of object 50. Region of interest 52 comprises a localized portion, section, and/or part(s) of the object. In FIG. 1, an example of object 50 is illustrated in which object 50 comprises an aircraft 51. Further, in FIG. 1, an example of region 52 is illustrated as comprising an upper forward portion of fuselage 54 of aircraft 51. However, it should be appreciated that, in other examples, region 52 includes other parts and/or regions of aircraft 51 and/or object 50 includes non-aircraft objects. In particular, region 52 of aircraft 51 may include a different part of aircraft 51 such as at least a part and/or region of one or more of wings 60, engines 64, empennage 70, and/or other part of the aircraft, such as the interior of the aircraft. Further, in other examples, object 50 includes a non-aircraft object, such as a portion and/or region of a consumer product, piece of equipment, material, part, and/or commercial product, as just some examples.

The surface anomalies include one or more of a protrusion (e.g., bump), an indentation (e.g., dent), a hole (e.g., missing fastener), a gap, and a discoloration (e.g., tooling mark) on the object.

System 8 includes a computing device 10 programmed with computer-readable instructions 19 (also referred to herein as "software 19") for generating synthetic EMR profiles and/or images of object 50 and to detect surface anomalies on object 50 based, at least in part, on the generated synthetic EMR profiles and/or images. Computing device 10 includes a processing unit 12, a memory unit 14, and optionally includes a display unit 11. Memory unit 14 is configured to store the computer-readable instructions and processing unit 12 is configured to execute the stored computer-readable instructions to perform the various computing functions. For example, processing unit 12 is configured to execute the computer-readable instructions stored in memory unit 14 to generate the synthetic EMR profiles and/or images of object 50 and to detect whether object 50 contains a surface anomaly based, at least in part, on the generated synthetic EMR profiles and/or images.

Memory unit 14 comprises non-volatile (also referred to herein as "non-transitory") memory 18 (e.g., ROM, PROM, and EPROM) and optionally includes volatile (also referred to herein as "transitory") memory 16 (e.g., RAM, SRAM, and DRAM). The processing unit 12 comprises integrated circuits including one or more of field-programmable gate arrays (FPGAs), application-specific integrated circuits (ASICs), digital signal processors (DSPs), microprocessors, microcontrollers, programmable array logic (PALs), and complex programmable logic devices (CPLDs).

As will be described in greater detail below, computing device 10 is programmed to execute various methods, such as methods schematically represented in FIGS. 3 and 4. In some examples, memory unit 14 is configured to store computer-readable instructions 19 for performing the methods, and processing unit 12 is configured to execute the methods responsive to various inputs. As just one example, processing unit 12 is configured to generate synthetic EMR profiles and/or images of object 50 and/or to determine whether object 50 contains a surface anomaly based on captured EMR profiles and/or images of object 50 received from an EMR-sensing system 30.

As will be discussed in greater detail below with reference to FIGS. 2-4, computer-readable instructions 19 include a machine learning algorithm that is configured to generate synthetic EMR profiles and/or images of object 50, in some examples. Additionally or alternatively, computer-readable instructions 19 include one or more algorithms for determining whether object 50 contains a surface anomaly, such as by comparing the synthetic EMR profiles and/or images of object 50 and/or measured EMR profiles and/or images (also referred to herein as "observed EMR profiles and/or images," and/or "captured EMR profiles and/or images") of object 50 received from EMR-sensing system 30, to control EMR profiles and/or images of object 50 where object 50 does not contain any surface anomalies.

In some examples, the machine learning algorithm configured to generate synthetic EMR profiles and/or images of object 50 is trained using training data 20. Training data 20 includes real, measured (e.g., camera-captured) EMR profiles and/or images that are representative of the measured EMR profiles, of object 50 and/or of one or more objects identical to and/or similar to object 50. In some examples, training data 20 includes EMR profiles and/or images representing different EMR frequency and/or wavelength ranges. As one such example, training data 20 includes EMR profiles and/or images of a first type 22 and EMR profiles and/or images of a second type 24. When the training data includes EMR profiles, the first type and second type of the EMR profiles include different ranges of wavelengths and/or frequencies. When the training data includes images representing the EMR profiles, the first type and the second type of images visually represent the different ranges of wavelengths and/or frequencies of the EMR profiles. As just one such example, first type 22 includes EMR profiles having wavelengths in the visible light spectrum and/or optical images representing EMR wavelengths in the visible light spectrum and second type 24 includes EMR profiles having wavelength in the infrared spectrum and/or thermal images representing EMR wavelength in the infrared spectrum. In some examples, training data 20 is gathered using cameras (such as cameras of EMR-sensing system 30). In some examples, the cameras are configured to move on rails or other structures to capture images of different portions of object 50 and/or to capture different perspectives of object 50. In some examples, the cameras include video cameras.

In some examples, training data 20 includes time-paired EMR profiles and/or images of the two types of EMR profiles and/or images. That is, each measured EMR profile and/or image of the first type is time-paired with (i.e., taken at the same time as) one of the EMR profiles and/or images of the second type. Thus, in such examples, training data 20 includes synchronized pairs of EMR profiles and/or images, wherein each pair includes different types of EMR profiles and/or images (e.g., one thermal image and one optical image) taken at the same time and/or taken under the same ambient conditions.

In some examples, training data 20 includes measurements of the ambient conditions (e.g., temperature, lighting, humidity, etc.) that existed at the time the EMR profiles and/or images of first type 22 and/or second type 24 were captured. For example, the ambient conditions are measured via one or more ambient condition sensors such as any one or more of the ambient condition sensors of an ambient condition monitoring system 40. Thus, in such examples, not only does training data 20 include measured EMR profiles and/or images of object 50 (or an object identical to and/or similar to object 50), training data 20 additionally includes measurements of the ambient conditions that existed at the time those EMR profiles and/or images were taken. By including the ambient condition measurements in the training data, the machine learning algorithm of the present disclosure may learn how these ambient conditions affect the EMR profiles of the object, thereby generating more accurate synthetic EMR profiles and/or images of the object after training, and improving the overall accuracy and reliability of the surface anomaly detection process.

When included, display unit 11 is configured to present displays to a user. For example, display unit 11 includes a display screen, such as one or more of an LCD, plasma, LED, CRT, and/or other type of display screen. In some examples, display unit 11 is configured to display the results of an inspection of object 50. For example, display unit 11 is configured to indicate to a user whether object 50 contains a surface anomaly. If the object contains one or more surface anomalies, the display unit 11 is configured to indicate one or more of: how many surface anomalies exist on the region of interest and/or the object, a location of each of the surface anomalies on the region of interest and/or the object, a type of each of the surface anomalies (e.g., scratch, dent, bump, hole, discoloration, etc.), a confidence level for each of the surface anomalies, and a morphology and/or geometry of each of the surface anomalies. In some examples, the anomaly type is indicated using different color and shape coded indicators. In some examples, indicating the morphology and/or geometry of a surface anomaly includes indicating the size, curvature, and/or extent of the surface anomaly.

In some examples, display unit 11 provides a set of one or more time series still photographs that include the identified location of the surface anomaly, and the physical characteristics of the region of interest in which the surface anomaly is included. In some such examples, the physical characteristics include one or more of: airplane coordinates, the name of the part and/or assembly in which the surface anomaly is included, and/or an airplane unique identifier. In other examples, display unit 11 includes a display screen (as discussed above) that is configured to provide a 2D visual representation of the surface anomaly on the object and/or region of interest. In yet further examples, display unit 11 includes a wearable device (such as a virtual reality headset, haptic suit, etc.) that is configured to provide an immersive view of the surface anomaly from multiple perspectives.

In some examples, display unit 11 is configured to receive user input. As an example, a user adjusts one or more parameters of the anomaly detection process via the display unit. For example, the user adjusts one or more of Speeded Up Robust Features (SURF) and RANdom SAmple Consensus (RANSAC) parameters via display unit 11. As an example, display unit 11 permits a user to adjust a SURF Hessian threshold parameter for the SURF and/or a minimum distance parameter for the SURF. In some examples, display unit 11 permits a user to adjust a maximum local displacement value for the RANSAC. The maximum local displacement value controls the size of the region that the RANSAC algorithm will search in its attempts to find matching features. This value selects the maximum number of pixels that a feature point may be displaced between images being registered and still be considered as matching. In some examples, display unit 11 permits a user to adjust a high residual threshold and/or a low threshold that control the difference between features in different, compared EMR profiles that are still considered as matching.

In some examples, display unit 11 is configured to permit a user to select how surface anomalies are displayed. As an example, a user adjusts the annotation used to indicate the surface anomaly. For example, the user adjusts one or more of the annotation type (e.g., oval, square, etc.) and annotation color that is used to display the surface anomaly (which may depend on the type of the surface anomaly) via display unit 11.

System 8 optionally includes EMR-sensing system 30, in some examples. When included, EMR-sensing system 30 includes one or more EMR receivers that are configured to capture, receive, record, measure, and/or otherwise be sensitive to EMR. For example, EMR-sensing system 30 includes a first receiver 32 and/or a second receiver 34. In some examples where both first receiver 32 and second receiver 34 are included in EMR-sensing system 30, first receiver 32 and second receiver 34 are configured to capture different ranges of EMR wavelengths and/or frequencies. As one such example, first receiver 32 is configured to detect, capture, and/or otherwise measure higher frequency, shorter wavelength EMR than second receiver 34. That is, first receiver 32 is configured to detect, capture, and/or otherwise measure a first type EMR profile that includes a first range of wavelengths, and second receiver 34 is configured to detect, capture, and/or otherwise measure a second type of EMR profile that includes a second range of wavelengths, wherein the first range of wavelengths is shorter than the second range of wavelengths. As just one such example, first receiver 32 is configured to capture EMR in the visible light spectrum (e.g., via a photographic film and/or a digital sensor) and second receiver 34 is configured to capture EMR in the infrared spectrum (e.g., via one or more microbolometers).

In some examples, EMR-sensing system 30 is configured to capture EMR profiles of object 50. In some such examples, EMR-sensing system 30 is configured to capture EMR profiles of region of interest 52 of object 50. The EMR profiles comprise the EMR coming from the region of interest and/or the object.

In some examples, EMR-sensing system 30 is configured to generate images of object 50 based on the captured EMR profiles. In such examples, EMR-sensing system 30 comprises one or more cameras. For example, first receiver 32 includes a first camera, and second receiver 34 includes a second camera. As just one such example, the first camera is an optical camera that is configured to generate visual images based on EMR in the visible light spectrum (e.g., 400-700 nanometer wavelengths) and the second camera is a thermal camera that is configured to generate visual images based on EMR in the infrared spectrum (e.g., 700-1400 nanometer wavelengths).

It should be noted that in the description herein, images of object 50 (e.g., camera-captured images and/or computer-generated synthetic images) are visual (optical) representations of the captured EMR profiles. Thus, the cameras are configured to collect, capture, and/or otherwise measure the EMR profiles of the object and generate images (optical representations) of the object based on the collected EMR. Thus, when the collected EMR is outside the visible light spectrum, the cameras (when included) are configured to convert and/or generate visual (optical) representations of the EMR that is outside the visible light spectrum. For example, a thermal camera is configured to capture, collect, and/or otherwise measure infrared radiation, and to generate a visible (optical) representation (image) of the collected infrared radiation.

EMR-sensing system 30 is configured to send the captured EMR profiles to computing device 10 as one or more of raw EMR profiles and/or as visual representations (images) of the captured EMR profiles. Thus, the EMR-sensing system 30 sends EMR profiles and/or images of object 50 (e.g., region of interest 52) to computing device 10.

Computing device 10 is configured to receive the EMR profiles and/or images of object 50 (and in particular, to receive EMR profiles and/or images of region of interest 52) from EMR-sensing system 30. For example, computing device 10 is configured to receive EMR profiles and/or images captured by one or more of first receiver 32 and second receiver 34 via an electrical connection with EMR-sensing system 30. As examples, EMR-sensing system 30 and computing device 10 are in electrical communication with one another via a wired and/or a wireless connection. In this way, EMR-sensing system 30 is configured to capture EMR profiles and/or images of object 50 via the one or more receivers (e.g., first receiver 32 and/or second receiver 34) and is configured to send these captured EMR profiles and/or images to computing device 10 for subsequent analysis. As discussed above, upon receiving the captured EMR profiles and/or images from EMR-sensing system 30, computing device 10 is configured to generate synthetic images of object 50 based on these received EMR profiles and/or images and/or to determine whether object 50 contains any surface anomalies based on these received images and/or the generated synthetic images.

System 8 optionally includes ambient condition monitoring system 40, in some examples. When included, ambient condition monitoring system 40 includes one or more ambient condition sensors, including one or more of a first ambient condition sensor 42 and a second ambient condition sensor 44, that are configured to measure various ambient conditions. As examples, first ambient condition sensor 42 is configured to measure ambient temperature, second ambient condition sensor 44 is configured to measure ambient humidity, and third ambient condition sensor 46 is configured to measure ambient lighting. However, in other examples, ambient condition monitoring system 40 may include fewer or more sensors. As an example, ambient condition monitoring system 40 includes additional ambient condition sensors for monitoring precipitation, atmospheric pressure, and/or other ambient condition parameters. In some examples, the ambient condition sensors are configured to measure the ambient conditions at a point on or proximate to object 50. Additionally or alternatively, the ambient condition sensors are configured to measure the ambient conditions at different points around object 50 to provide an indication of gradients that may exist around the object 50. As one example, the ambient temperature sensor is configured to measure ambient temperature at various locations around object 50 to provide an indication of temperature variations across the object.

When configured to measure ambient lighting, third ambient condition sensor 46 is configured to measure one or more lighting properties, including one or more of: light intensity on object 50 and/or region of interest 52, light intensity distribution on object 50 and/or region of interest 52, light pattern on object 50 and/or region of interest 52, light sequence on object 50 and/or region of interest 52, light source orientation (the direction from which the light is emanating), and the frequency and/or wavelength range of the light (which indicates the type of light such as natural vs. artificial light, UV light, etc.).

Computing device 10 is configured to receive ambient condition measurements from ambient condition monitoring system 40. For example, computing device 10 is configured to receive measurements of one or more ambient conditions from one or more of first ambient condition sensor 42, second ambient condition sensor 44, and third ambient condition sensor 46 via an electrical connection with ambient condition monitoring system 40. As examples, ambient condition monitoring system 40 and computing device 10 are in electrical communication with one another via a wired and/or a wireless connection. In this way, ambient condition monitoring system 40 is configured to measure and/or record one or more ambient conditions (e.g., temperature, humidity, lighting, pressure, etc.) and is configured to send these ambient condition measurements to computing device 10 for subsequent analysis. As discussed below, in some examples, computing device 10 is configured to adjust how it generates the synthetic EMR profiles and/or images of object 50 and/or to adjust how it determines whether or not object 50 contains surface anomalies based on these received ambient condition measurements.

In some examples, one or more of the sensors of the ambient condition monitoring system 40 are configured to measure and/or record the ambient conditions when EMR-sensing system 30 captures an image of object 50. As just one example, when configured to measure ambient temperature, first ambient condition sensor 42 is programmed and/or other configured to measure and/or record the ambient temperature when EMR-sensing system 30 captures an EMR profile and/or image of object 50. Thus, in some such examples, the sensors of ambient condition monitoring system 40 are configured to measure the ambient conditions at the same time when EMR-sensing system 30 captures an EMR profile and/or image of object 50 (e.g., simultaneously with the EMR profile and/or image capture) and/or within a duration of the EMR profile and/or image capture (i.e., before and/or after the image capture) in which the ambient conditions are within a threshold (e.g., 5%) of what they were at the time of the EMR profile and/or image capture.

In this way, ambient condition monitoring system 40 records the ambient conditions present when each EMR profile and/or image of object 50 is captured. By measuring one or more of the ambient conditions at the time when an EMR profile and/or image of object 50 is captured, computing device 10 may account for these ambient conditions when generating the synthetic EMR profiles and/or images of object 50 and/or when determining whether object 50 contains surface anomalies, thereby improving the accuracy and reliability of the surface anomaly detection routine disclosed herein.

Figure 2:
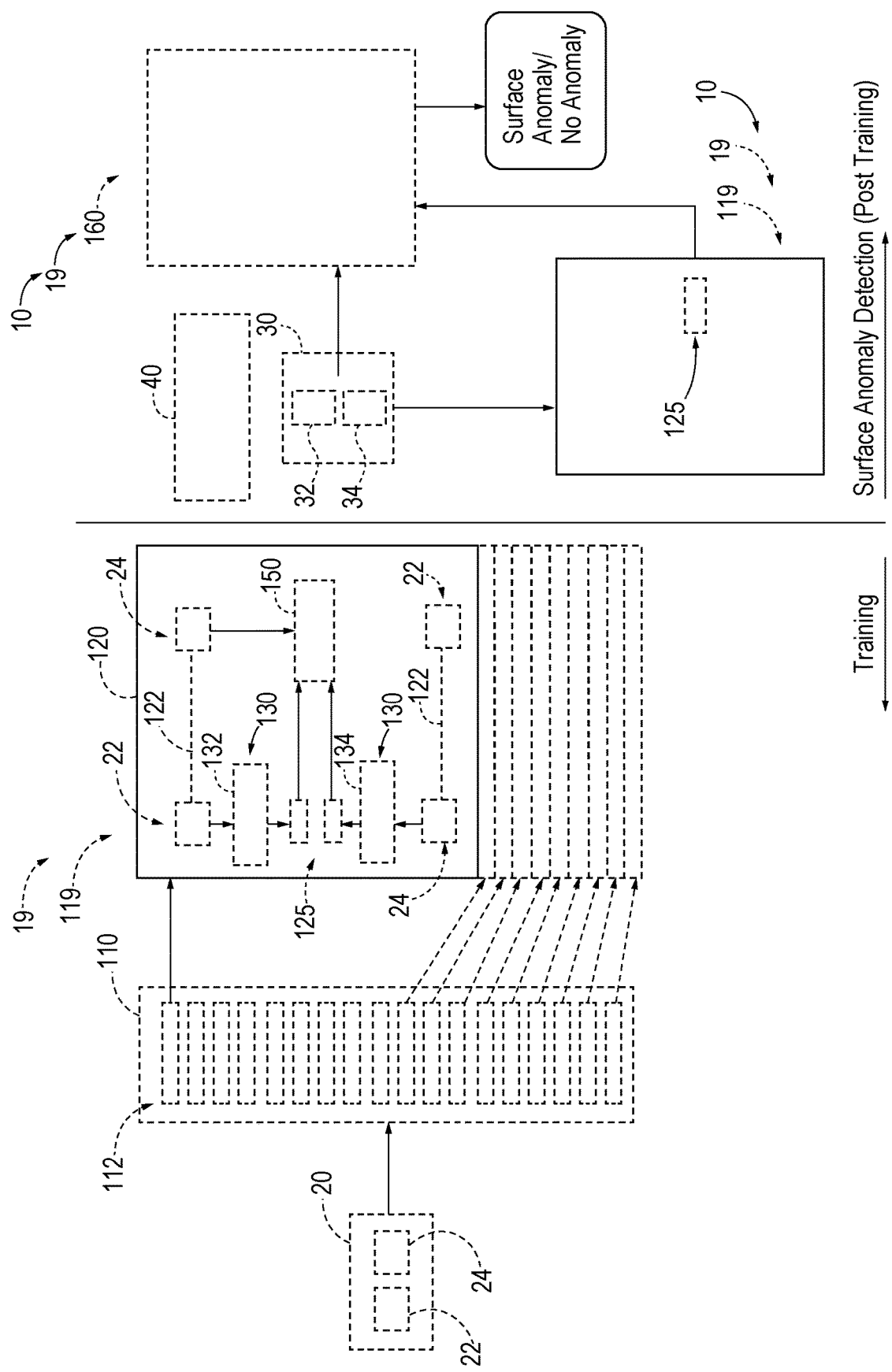
FIG. 2 is schematic representation of the training and post-training of a machine learning algorithm configured to generate synthetic images of an object under inspection, according to the present disclosure.

FIG. 2 schematically illustrates an example of how one or more algorithms, such as the machine learning algorithm that is stored as computer-readable instructions 19 in non-transitory memory 18 of computing device 10, is trained and/or utilized to generate synthetic EMR profiles 125 and/or synthetic images 125 of object 50 and/or to determine whether object 50 contains a surface anomaly. Because synthetic EMR profiles 125 include more than one EMR profile, synthetic EMR profiles 125 may be referred to herein as "two or more synthetic EMR profiles 125."

Thus, the algorithms illustrated in FIG. 2 are examples of algorithms that are stored as computer-readable instructions 19 in non-transitory memory 18 of computing device 10. In particular, the one or more algorithms include a machine learning algorithm 119 that, when executed by processing unit 12, is configured to generate synthetic EMR profiles 125 and/or synthetic images 125 of an object (e.g., object 50). Optionally, the one or more algorithms additionally include a surface anomaly detection algorithm 160 that, when executed by processing unit 12, is configured to determine whether the object contains a surface anomaly based on the generated synthetic images and/or the measured (e.g., camera-captured) images.

Thus, computing device 10 may utilize captured EMR profiles and/or images to generate synthetic EMR profiles and/or synthetic images. For simplicity in the rest of the description, only the EMR profiles (both captured and synthetic), not the images, will be recited, since it should be understood that the images are just visual representations of the EMR profiles. It should still be appreciated that the "images" may be used interchangeably whenever "EMR profiles" is recited, and thus may be used in addition to, or in place of, any instance in which "EMR profiles" is recited.

In one example, machine learning algorithm 119 comprises a generative adversarial network (GAN) that includes one or more generators 130 and one or more discriminators 150. The one or more generators are configured to, based on an EMR profile and/or image of the object from the training data (during training) and/or based on an EMR profile of the object received from EMR-sensing system 30 (after training), generate a synthetic EMR profile 125 (also referred to herein as synthetic image 125) of the object that is a different type than the initial EMR profile received from the training data and/or EMR-sensing system. In some examples, synthetic EMR profile 125 is an EMR profile of the entire object. In other examples, synthetic EMR profile 125 is an EMR profile of just a region of interest (e.g., region of interest 52) of the object. As just one example, one or more generators 130 are configured to generate a synthetic thermal EMR profile of the object based on a captured optical EMR profile of the object. As another example, one or more generators 130 are configured to generate a synthetic optical EMR profile of the object based on a captured thermal EMR profile of the object. Thus, one or more generators 130 are configured to convert EMR profiles of the object into another type (e.g., from thermal to optical and/or from optical to thermal). As such, machine learning algorithm 119 may be referred to herein as image translation model 119.

In some examples, image translation model 119 is bidirectional. That is, image translation model 119 is configured to convert back and forth between different types of EMR profiles and/or images, not just from one type to the other. As one such example, image translation model 119 is configured to convert optical EMR profiles to thermal EMR profiles and also to convert thermal EMR profiles to optical EMR profiles. In some such examples, image translation model 119 is configured to reconstruct the original training EMR profile (on which the generated synthetic EMR profile is based) based on the generated synthetic EMR profile to generate a loss function and/or otherwise validate the generated synthetic EMR profile. In some such examples, a first generator is configured to generate a synthetic EMR profile of a different EMR profile type than that of the training EMR profile and then another generator is configured to convert the generated synthetic EMR profile back to the EMR profile type of the training EMR profile. As one such example, if the first generator is configured to generate a thermal EMR profile based on an optical EMR profile, a second generator is configured to generate a synthetic optical EMR profile based on the synthetic thermal EMR profile. In some examples, a loss function for the reconstructed EMR profile is then calculated by performing an image comparison (e.g., subtracting images). As illustrated in FIG. 2, during training of machine learning algorithm 119 (the left side of FIG. 2), the one or more generators 130 learn how to generate increasingly accurate (realistic) synthetic EMR profiles 125 of the object from training data 20 by attempting trick the one or more discriminators 150 into believing that the generated synthetic EMR profiles are actual captured EMR profiles of the object (real EMR profiles).

As discussed above, training data 20 comprises time-paired EMR profiles 122 (also referred to as "time-paired images" 122), wherein each pair of time-paired EMR profiles 122 comprises one EMR profile of first type 22 (also referred to herein as first image type 22) and another EMR profile of second type 24 (also referred to herein as second image type 24). In some examples, one of the EMR profiles of a given pair of time-paired EMR profiles 122 is fed to the one or more generators, and the other EMR profile (of the different EMR profile type) is fed to the one or more discriminators. The one or more generators are configured to calculate, predict, and/or otherwise generate a synthetic EMR profile 125 of a different type than the type fed to the one or more generators (i.e., the same EMR profile type as the EMR profile fed to the one or more discriminators). As just one example, if the one or more generators are fed an optical EMR profile and the one or more discriminators are fed a time-paired thermal EMR profile, the one or more generators are configured to generate a synthetic thermal EMR profile.

When machine learning algorithm 119 is configured to be bidirectional, one or more generators 130 include two generators that are configured to perform opposite EMR profile conversions. In such examples, the one or more generators include a first generator 132 that is configured to generate a synthetic EMR profile 125 of second type 24 based on an input EMR profile of first type 22 and a second generator 134 that is configured to generate a synthetic EMR profile 125 of first type 22 based on an input EMR profile of second type 24. As just one example, first generator 132 is configured to generate thermal EMR profiles based on optical EMR profiles and second generator 134 is configured to generate optical EMR profiles based on thermal EMR profiles.

Additionally or alternatively, the one or more generators are configured to generate synthetic reconstruction EMR profiles based on the synthetic EMR profile of the other generator. In some such examples, the synthetic reconstruction EMR profiles are the same EMR profile type as the training EMR profile fed to the generator that generated the synthetic EMR profile. Continuing the above example where first generator 132 is configured to generate synthetic thermal EMR profiles based on received optical EMR profiles, second generator 134 is configured to generate synthetic reconstruction EMR profiles that are optical (just like the initial training EMR profile fed to the first generator). Thus, in such examples, second generator 134 is configured to reconstruct the initial EMR profile (i.e., convert the synthetic thermal EMR profile back to optical) based on the synthetic EMR profile generated by the first generator. In some examples, the synthetic reconstruction EMR profiles are used to validate, check, and/or update the logic of the one or more generators. As an example, and as explained in greater detail below, the synthetic reconstruction EMR profiles are checked against actual observed training EMR profiles (e.g., training data 20) to improve the bidirectional translation accuracy of the image translation model. As just one example, the synthetic reconstruction EMR profiles are used to determine a loss function for the image translation model during training of the image translation model.

The one or more discriminators are fed real (also referred to herein as "observed" and/or "measured") and synthetic EMR profiles and are configured to predict whether a given EMR profile is real (captured by a receiver) or synthetic (generated by the one or more generators) and/or assess a likelihood that a given EMR profile and/or part of an EMR profile (e.g., a pixel) is real or synthetic. During training, the one or more discriminators learn how to predict, with increasing accuracy, whether a given EMR profile is real or synthetic. And, as described above, the generators learn how to generate increasingly accurate synthetic EMR profiles during training. For example, the machine learning algorithm 119 includes one or more loss functions that are configured to update the logic of the one or more generators and/or the one or more discriminators based on their performance (i.e., whether the generator successfully fools the discriminator into believing the generated synthetic EMR profile is real and/or whether the discriminator correctly identifies (labels) the real and synthetic EMR profiles, respectively. As examples, the loss function of machine learning algorithm 119 includes one or more of a minimax loss function, a least squares loss function, and/or a Wasserstein loss function.

As described above, when the image translation model comprises a bidirectional GAN model, the loss function is determined based on comparing the synthetic reconstruction EMR profile (i.e., the EMR profile generated based on a synthetic EMR profile, that is the same EMR profile type as the training EMR profile on which the generated synthetic EMR profile was based) to the training EMR profile. As an example, a reconstruction loss is the squared error between the synthetic reconstruction EMR profile and the training EMR profile, and a discriminator loss is the squared error between the synthetic EMR profile and the other type of EMR profile of the time-paired EMR training profile pair (i.e., the same EMR profile type as the synthetic EMR profile). In some such examples, a total loss equals a discriminator loss plus a reconstruction loss.

As an example, first generator 132 is fed an EMR profile of first type 22 from one of time-paired EMR profiles 122 of training data 20. First generator 132 is configured to generate a synthetic EMR profile of second type 24 based on the training EMR profile. In some such examples, second generator 134 is configured to generate a synthetic reconstruction EMR profile of first type 22 (the same type as the original training EMR profile) based on the synthetic EMR profile generated by first generator 132. Thus, second generator 134 is configured to reconstruct the original training EMR profile fed to first generator 132 based on the synthetic EMR profile generated by the first generator. Synthetic reconstruction EMR profile of first type 22 is then compared to the training EMR profile of first type 22 (the training EMR profile fed to the first generator) to determine the reconstruction loss, and the synthetic EMR profile of second type 24 is compared to a training EMR profile of second type 24 that is from the one of the time-paired EMR profiles of training data 20 that was initially fed to the first generator, to determine the discriminator loss.

In some examples, the training of machine learning algorithm 119 is unsupervised. In other examples, it is semi-supervised. In still further examples, it is supervised.

In some examples, machine learning algorithm 119 is configured to account for changes in ambient conditions (e.g., temperature, humidity, lighting, pressure, etc.) that may occur between EMR profile captures. Stated slightly differently, machine learning algorithm 119 is configured to adjust how it generates the synthetic EMR profiles based on changes in one or more of the ambient temperature, humidity, lighting, pressure, etc. Thus, machine learning algorithm 119 of the present disclosure is configured to account for how changes in these ambient conditions affect the EMR profiles of the object under inspection. As described above, one or more of the ambient conditions are measured at a single point on, or proximate to, the object under inspection, in some examples. Additionally or alternatively, one or more of the ambient conditions are measured at various points along and/or around the object under inspection, providing an indication of a gradient and/or variance of the one or more ambient conditions surrounding the object under inspection.

As one example, machine learning algorithm 119 learns how to account for these changes in ambient conditions during training through the use of binning. In some such examples, computing device 10 and/or another computing device includes a binning module 110 that is configured to group the EMR profiles of training data 20 into a plurality of bins 112 based on one or more of the ambient conditions (e.g., one or more of ambient temperature, ambient humidity, ambient lighting, ambient pressure, etc.). That is, when included, the plurality of bins, each represent a unique set of ambient conditions (e.g., a unique range of temperatures, humidities, and/or lighting conditions). In some such examples therefore, the EMR profiles included in a given bin have been taken under similar ambient conditions (i.e., ambient conditions that fall within the unique range of temperatures, humidities, lighting conditions and/or other ambient conditions associated with that bin).

In some examples, the binning is based on changes in the ambient conditions. That is the binning includes a variable gradient assessment. In some such examples, bins 112 are based on the relative rate of change of the ambient conditions and/or the combined relation of the relative rate of change of the ambient conditions to the variance in detection. As an example, different bins exist for artificial ambient lighting and natural lighting. In some such examples, the artificial lighting bins are further broken down into different sub-bins based on known characteristics of the artificial lighting (e.g., intensity level, orientation, location, etc.). In some examples where binning is employed, machine learning algorithm 119 includes a plurality of sub-models 120 (each containing its own unique one or more generators and one or more discriminators) that are trained only on the EMR profiles from a subset (e.g., one) of the bins. As just one example, each of the sub-models is trained on a single, unique one of the bins, such that all of the sub-models are trained on different bins. Through the use of binning therefore, the training data is divided into bins of EMR profiles that are related in that they were captured under the same and/or similar ambient conditions. Thus, rather than being trained wholesale on the entire set of training data, each sub-model is trained on a bin-by-bin basis with EMR profiles taken under similar ambient conditions.

In some examples where binning is used, the EMR profiles of the training data are labelled based on one or more of the ambient conditions to provide an indication to the one or more generators of the one or more ambient conditions that existed when the EMR profiles were taken. Thus, as examples, the EMR profiles of the training data include one or more of ambient temperature labels, ambient humidity labels, and/or ambient lighting labels that indicate the corresponding ambient conditions under which each EMR profiles was captured. By informing the one or more generators of the ambient conditions for each EMR profile of the training data, machine learning algorithm 119 is conditioned based on one or more of the ambient conditions. As such, machine learning algorithm 119 may be referred to a conditional GAN (or CGAN) in examples where it is a GAN.

By employing binning during the training process, each sub-model 120 may develop a unique logic for generating the synthetic EMR profiles that is particularly well suited for the range of ambient conditions on which the sub-model was trained. That is, because each sub-model 120 may be trained on a unique set of EMR profiles corresponding to a unique, narrow range of ambient conditions, each sub-model 120 may be configured to generate more accurate synthetic EMR profiles for the range of ambient conditions on which it was trained than the other sub-models. As such, after the training (when performing an inspection to determine if an object contains a surface anomaly), the appropriate sub-model (the one that was trained on ambient conditions most similar to those existing when the captured EMR profile of the object under inspection was taken) may be selected for performing the synthetic EMR profile generation.

In some examples, machine learning algorithm 119 is configured to generate synthetic EMR profiles 125 based on where the region of interest (region of interest 52) is located on object 50 and/or based on one or more physical characteristics of the object under inspection, such as one or more of a shape of the object, a color and/or color scheme of the object, a type of the object, one or more parts included in the objects, a composition of the object, a surface coating of the object, one or more reflective properties of the object, etc.

In some examples, machine learning algorithm 119 is configured to detect where the region of interest is located on object 50 and to, based on where the region of interest is located, determine one or more of the physical characteristics associated with the region of interest. For example, upon recognizing that the region of interest is an upper forward portion of a fuselage, machine learning algorithm 119 determines that the region of interest comprises an aluminum and/or composite skin with an anodized and/or untreated surface, one or more fasteners, and green paint.

In this way, machine learning algorithm 119 is configured to generate synthetic EMR profiles are based on one or more physical characteristics of the region of interest including one or more of: a type of the part(s) included in the region of interest (e.g., fuselage skin), a shape of the region of interest, part(s) included in the region of interest, a composition of the part(s) in the region of interest (e.g., carbon fiber, aluminum, etc.) and a surface coating included on the part (e.g., type, color, composition, and/or thickness of a paint, sealant, or other surface coating). In some examples, the machine learning algorithm 119 is configured to generate the synthetic EMR profiles based on the location of the region of interest and/or the one or more physical characteristics in the same and/or similar manner to that described above for the ambient conditions (e.g., using binning and/or conditioning).

As one example, during training of machine learning algorithm 119, training data 20 is initially classified, grouped, filtered, binned, and/or otherwise sorted based on the location of the region of interest and/or the one or more physical characteristics of the region of interest, before being further binned based on the ambient conditions. In one such example, training data 20 is first classified, split, grouped, filtered, sorted, binned, and/or otherwise organized based on where the region of interest under inspection is located on the aircraft in which it is included. For example, images of an upward forward portion of the fuselage are grouped together in a different bin or set of bins than a rearward lower portion of the fuselage, and different sets of sub-models are trained on those different bins of EMR profiles (e.g., a first set of sub-models is trained only on the EMR profiles of the upward forward portion of the fuselage and a second set of sub-models is trained only on the EMR profiles of the rearward lower portion of the fuselage). When that same upward forward portion of the fuselage is being inspected for surface anomalies, the first set of sub-models that were trained on that particular section of the fuselage are selected from to generate the synthetic EMR profiles.

As another example, training data 20 is classified, grouped, filtered, and/or binned based on a color of the paint of the aircraft part under inspection. Thus, when then paint color is gray, for example, EMR profiles of the aircraft having the gray paint color are grouped together and a set of the sub-models are trained on only the gray paint color. Then, when a gray-colored aircraft is being inspected for surface anomalies, the set of sub-models that was trained based on the gray paint color are selected from to generate the synthetic EMR profiles.

In this way, machine learning algorithm 119 and/or other training algorithms may sort the training data during training into bins based on region of interest location, and/or the one or more physical characteristics associated with the region of interest, and train each sub-model on a bin-by-bin basis such that each sub-model is trained on EMR profiles of the same and/or similar region of interest, paint color and/or other physical characteristics, and/or ambient conditions. After training, when detecting for surface anomalies, machine learning algorithm 119 selects the sub-model that most closely matches the physical characteristics (e.g., object location, paint color, etc.) and/or ambient conditions of the object under inspection.

In some examples, the sub-model selection process includes a hierarchy and/or weighting system. As one example, this hierarchy includes (in decreasing order of importance) one or more of: region of interest location (highest order classification), surface coating (e.g., paint color), ambient temperature, and other ambient conditions (lowest order classification). Thus, in some such examples, the physical characteristics are higher in the hierarchy (and therefore take precedence over) the ambient conditions. In some such examples, received images and/or EMR profiles are first categorized based on the object location (region of interest), then the surface coating (e.g., paint color), then ambient temperature, and then the other ambient conditions.

In such examples, machine learning algorithm 119 initially narrows down the sub-models it will select from for the synthetic image generation based on the location of the region of interest and/or the one or more physical characteristics. In particular, the machine learning algorithm selects the set of sub-models that match (were trained on) the region of interest location and paint color of the object under inspection (e.g., sub-models that were trained on gray-painted upward forward portions of an aircraft fuselage). Then, from that set of sub-models representing the region of interest under inspection, the machine learning algorithm selects the appropriate sub-model to perform the synthetic EMR profile generation based on the ambient conditions. In particular, the machine learning algorithms selects the sub-model from that set of sub-models that matches (was trained on) one or more ambient conditions that match the one or more ambient conditions that existed when the EMR profile of the object under inspection was captured (e.g., a sub-model that was trained on EMR profiles of the object taken at the same and/or similar temperature, humidity, and/or lighting conditions).

Conditioning the machine learning algorithm during training based on the one or more physical characteristics of the object under inspection and/or based on the one or more ambient conditions that exist when the object is being inspected, may accelerate the training and/or may improve the reliability and/or accuracy of the machine learning algorithm. In particular, the one or more generators may learn to generate accurate synthetic EMR profiles more quickly when they are fed only a curated subset of the training data comprising similar EMR profiles. Further, the one or more generators may generate more accurate synthetic EMR profiles, because, through the binning process, they may learn how lower order variables (like humidity, lighting, pressure, etc.) may affect the EMR profiles (and therefore the images) of the object under inspection.

After training (the right side of FIG. 2), two or more observed EMR profiles and/or images (also referred to herein as "observed EMR profiles and/or images," "measured EMR profiles and/or images," and/or "captured EMR profiles") of the object under inspection (and in particular, of the region of interest of the object under inspection) are captured, measured, and/or otherwise observed by EMR-sensing system 30 at different ambient conditions. That is, EMR-sensing system 30 is configured to capture one or more EMR profiles and/or images at a first set of ambient conditions, and to capture one or more other EMR profiles and/or images at a second set of ambient conditions, where the first set of ambient conditions is different than the second set of ambient conditions. Additionally or alternatively, one or more ambient conditions are measured by the one or more sensors of ambient condition monitoring system 40 at approximately the same time that the EMR profiles are captured by the EMR-sensing system 30 to provide an indication of the ambient conditions that exist when the EMR profiles are captured by EMR-sensing system 30.

The two or more observed EMR profiles of the object under inspection and/or the ambient condition measurements are sent to and received by machine learning algorithm 119 and/or surface anomaly detection algorithm 160. As discussed above, based on the location of the region of interest on the object under inspection, the physical characteristics of the region of interest, and/or the ambient conditions that existed when the two or more observed EMR profiles of the region of interest were captured, machine learning algorithm 119 selects an appropriate sub-model 120 to perform the synthetic EMR profiles generation for each received captured EMR profile.

In some examples, the two or more observed EMR profiles received by machine learning algorithm 119 include unpaired EMR profile data. In such examples, the EMR profiles received by machine-learning algorithm 119 do not include both types of EMR profile types (e.g., both thermal and optical images) for a given time interval, or a given set of ambient conditions. Instead, only one of the EMR profile types is included in the unpaired EMR profile data for that given time interval and/or set of ambient conditions. For example, at a given time interval or set of ambient conditions, only an optical EMR profile or only a thermal EMR profile was captured. Thus, the other EMR profile type is missing from the EMR profiles received by machine learning algorithm 119. However, by generating time-paired synthetic EMR profiles for each captured EMR profile, the machine learning algorithm creates real-synthetic EMR profile pairs. Each real-synthetic EMR profile pair comprises different EMR profile types (e.g., thermal and optical EMR profiles) for the same time interval and/or set of ambient conditions. Thus, in some such examples, a given real-synthetic EMR profile pair comprises a captured EMR profile and computer-generated synthetic EMR profile of a different type (including a different range of EMR wavelengths) than the captured EMR profile that is time-paired with the captured EMR profile.

After the sub-model generates the synthetic EMR profile of a different type than the captured EMR profile, the synthetic EMR profile is sent to and received by surface anomaly detection algorithm 160. In this way, surface anomaly detection algorithm 160 receives both the computer-generated synthetic EMR profiles and the captured (real) EMR profiles. Surface anomaly detection algorithm 160 then determines whether the object under inspection contains a surface anomaly based on the generated synthetic EMR profiles and/or the captured EMR profiles of the object. In particular, surface anomaly detection algorithm 160 may utilize the surface anomaly detection routine described in commonly owned U.S. Pat. No. 10,643,329 entitled "AUTOMATED PAINT QUALITY CONTROL FOR AIRCRAFT" the disclosure of which is incorporated by reference herein in its entirety.

For example, the surface anomaly detection algorithm compares the synthetic EMR profiles and/or the captured EMR profiles of the object under inspection to what would be expected for an anomaly-free object. In some such examples, surface anomaly detection algorithm 160 includes a repository of EMR profiles of the object under inspection (taken under varying ambient conditions) for which it is known that the object under inspection does not contain a surface anomaly. Each real-synthetic EMR profile pair is then compared against these anomaly-free object EMR profiles to determine if the object under inspection contains a surface anomaly.

In some examples, the comparing is based on the varying ambient conditions. For example, when the captured EMR profiles are taken under varying ambient temperatures, the comparing is based on temperature. In some examples, the repository of anomaly-free object EMR profiles and the real-synthetic EMR profile pairs are ordered based on the ambient conditions at which they were taken into ambient condition gradients. For example, the repository of anomaly-free object EMR profiles and the real-synthetic EMR profile pairs are ordered based on the ambient temperatures at which they were taken into ambient temperature gradients.

In some examples, these gradients of the one or more time-varying ambient conditions are compared. For example, EMR profiles taken under the same ambient temperature are compared against one another, and this comparison is done at different temperatures with different EMR profile pairs to see how the EMR profiles of the captured and/or synthetic EMR profiles differ from the anomaly-free object EMR profiles over varying temperatures. In this way, anomalies may be detected based on how the different EMR profiles types (e.g., thermal and optical) of synthetic and/or captured EMR profiles compare to what would be expected for an anomaly-free object under varying ambient conditions (e.g., temperature).

Figure 3:
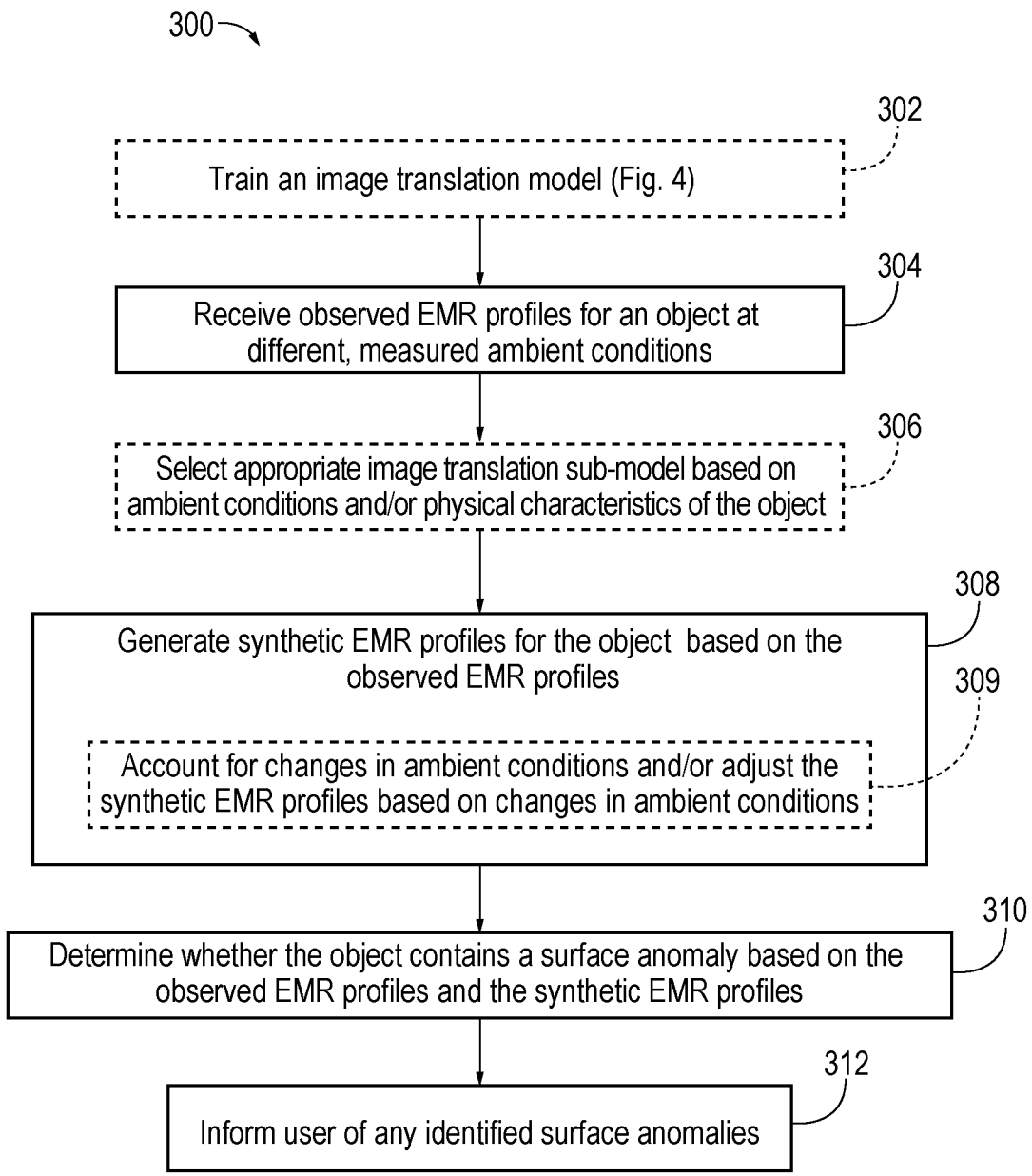
FIG. 3 is a flowchart schematically representing methods for detecting surface anomalies on an object using, at least in part, synthetically generated images of the object.
Figure 4:
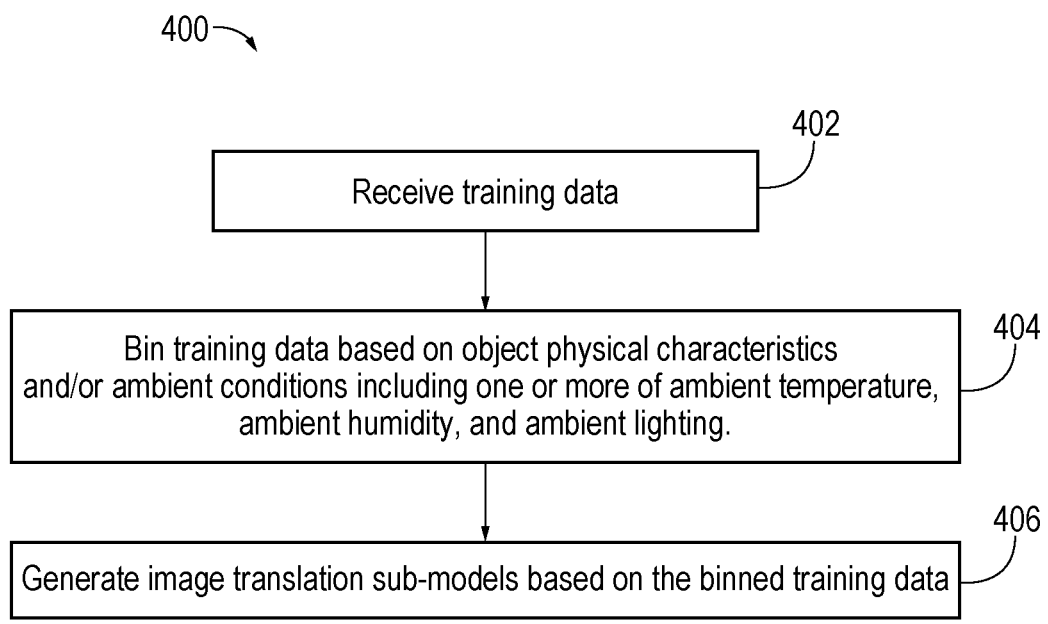
FIG. 4 is a flowchart schematically representing methods for training a machine learning algorithm configured to generate synthetic images of an object under inspection.

FIGS. 3-4 schematically provide flowcharts that represent illustrative, non-exclusive examples of methods according to the present disclosure. As discussed above, in some examples, the methods of FIGS. 3-4 are executed by a computing device (e.g., computing device 10). In such examples, the computing device includes computer-readable instructions (e.g., computer-readable instructions 19) stored in non-transitory memory (e.g., non-transitory memory 18) for executing the methods of FIGS. 3-4. In FIGS. 3-4, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 3-4 are not limiting and other methods and steps are within the scope of the present disclosure, including methods having greater than or fewer than the number of steps illustrated, as understood from the discussions herein.

FIG. 3 illustrates methods 300 for detecting surface anomalies on an object under inspection (e.g., object 50) based, at least in part, on computer-generated synthetic EMR profiles (synthetic EMR profiles generated by a machine learning algorithm (e.g., machine learning algorithm 119)) of the object. Methods 300 include receiving two or more observed EMR profiles (also referred to herein as "measured EMR profiles") for the object at different, measured ambient temperatures at 304, generating synthetic EMR profiles for the object based on the observed EMR profiles at 308, determining whether the object contains a surface anomaly based on the observed EMR profiles and the synthetic EMR profiles at 310, and informing a user of any identified surface anomalies at 312. As noted above, because the EMR profiles of the object may be visually represented in the form of images in some examples, the EMR profiles of the object also are referred to herein as images. Thus, the synthetic EMR profiles also are referred to herein as synthetic images, and the measured EMR profiles also are referred to herein as camera-captured images, in examples where an EMR-sensing system (e.g., EMR sensing system 30) configured to capture the images comprises one or more cameras.

As discussed above in reference to FIG. 2, when generating the synthetic EMR profiles (images), the machine learning algorithm (also referred to herein as image translation model) accounts for changes in ambient conditions, in some examples. Thus, the generating at 308 optionally includes accounting for changes in ambient conditions and/or adjusting the synthetic EMR profiles based on changes in ambient conditions at 309. As described above, changes in ambient conditions may be accounted for by using different sub-models of the machine learning algorithm that were trained on images taken at different ambient conditions. Thus, in some examples, when the ambient conditions change, a different sub-model is used to generate the synthetic EMR profiles, namely a sub-model that was conditioned on ambient conditions that are more similar to the current ambient conditions.

Accordingly, the methods 300 optionally include selecting the appropriate sub-model (e.g., one of sub-models 120) for the synthetic EMR profile generation based on the ambient conditions and/or physical characteristics of the object at 306. As described above in FIG. 2, the sub-model that was trained on images of the object having the same and/or similar physical characteristics (e.g., paint color, composition, etc.) is used to generate the synthetic EMR profile, in some examples. Additionally, the selecting of the sub-models at 306 is based on the location of a region of interest (region of interest 52) of the object under inspection.

In some examples, the methods 300 optionally include determining a confidence interval for the synthetic EMR profile and/or determining a likelihood that the generated synthetic EMR profile is valid. This confidence assessment is performed by comparing the synthetic EMR profile to the training data used to train the sub-model that generated the synthetic EMR profile. In particular, the synthetic EMR profile is compared to the EMR profile of the same type (e.g., same wavelength range) of the training data that most closely matches the ambient conditions under which the observed EMR profile (the one on which the synthetic EMR profile was based) was captured. For example if the observed EMR profile is in the visible light spectrum and the synthetic EMR profile is in the infrared spectrum, the confidence assessment comprises comparing the synthetic infrared profile to an infrared profile of the sub-model's training data that is most similar to the ambient conditions under which the observed visible light profile was captured.

The receiving the observed EMR profiles at 304 includes receiving captured EMR profiles of the object under inspection from one or more EMR receivers (e.g., first receiver 32 and/or second receiver 34) of an EMR-sensing system (e.g., EMR-sensing system 30).

Further, determining whether the object contains a surface anomaly at 310 comprises comparing the observed and synthetic EMR profiles (e.g., thermal and optical) to what would be expected for an anomaly-free object under the varying ambient conditions (e.g., varying ambient temperatures) at which the observed EMR profiles were captured. An example surface anomaly detection process is described above with reference to FIG. 2 and in commonly owned U.S. Pat. No. 10,643,329. In such examples, each observed and/or synthetic EMR profile is compared to a known anomaly-free EMR profile (i.e., control image) of the object comprising the same and/or similar type that was taken at the same and/or similar ambient temperature. For example, a synthetic and/or observed thermal EMR profile taken at 20° C. is compared to a known, anomaly-free thermal EMR profile of the object that was taken at 20° C. By comparing different types of EMR profiles (profiles comprising different ranges of wavelengths (e.g., thermal and optical EMR profiles)) of observed and/or synthetic EMR profiles of an object to EMR profiles of the object in which it is known that the object does not contain any surface anomalies, surface anomalies may be detected by monitoring how the observed and/or synthetic EMR profiles diverge from the anomaly-free EMR profiles over varying ambient conditions (e.g., over a temperature gradient).

In some examples, the comparing the observed and/or synthetic EMR profiles to the control EMR profiles includes aligning the observed and/or synthetic EMR profiles with the control EMR profiles based on surface features of the object 50 and/or region of interest 52, and then performing a pixel-by-pixel comparison based on the aligned profiles. In some such examples, the comparing includes detecting and/or identifying features in the EMR profiles (the observed and/or synthetic EMR profiles and the control EMR profiles) using one or more computer vision techniques. For example, suitable techniques include SURF. Such techniques identify visually apparent features in electronic images and/or EMR profiles, such as lines, contours, windows, fasteners, livery, etc., of object 50 and region of interest 52. Once the features have been identified in the control EMR profiles and the observed and/or synthetic EMR profiles, the comparing includes matching the features. In some such examples, the feature matching is performed using automated computer vision techniques. For example, RANSAC is used to match features between control and observed and/or synthetic EMR profiles.

In some such examples, RANSAC permits a user to adjust a maximum local displacement value which provides some tolerance for variations in a given feature's position in different EMR profiles. That is, features in the control EMR profile and the observed and/or synthetic EMR profile do not have to perfectly align in order for the feature extraction process to identify the features in the different profiles as being the same feature. Thus, when the displacement of features in the control EMR profiles and the observed and/or synthetic EMR profiles is less than the maximum local displacement value, the features are determined to match, and when the displacement of the features in the different EMR profiles is greater than the maximum local displacement value, the features are not considered to match. Thus, even when features are not precisely co-located in the different EMR profiles, so long as they are within a user-set maximum local displacement value, the features are identified as being the same.

In some examples, multiple control EMR profiles are merged and/or multiple observed and/or synthetic EMR profiles are merged when performing the feature identification and/or feature matching. In some such examples, the merged and/or overlaid EMR profiles include the union of detected features.

After aligning the EMR profiles (the control EMR profiles and the observed and/or synthetic EMR profiles) by identifying and matching the features, surface anomalies are detected, in some examples, by comparing the EMR profiles pixel-by-pixel and recording any differences that exceed a threshold. In some such examples, the anomaly detection utilizes a mathematical affine transformation (that is, a mathematical linear transformation that preserves points, straight line, and planes) between the control EMR profiles and the observed and/or synthetic EMR profiles. Informing the user of any identified surface anomalies at 312 optionally includes displaying the identified surface anomalies via a display (e.g., display unit 11). In some examples, the informing includes displaying one or more of a location of the surface anomaly, a type of the surface anomaly (e.g., scratch, dent, bump, hole, discoloration, etc.), and a morphology and/or geometry of the surface anomaly. In some such examples, the informing includes rendering a highlight or other annotation (e.g., a circular, oval, rectangular, or square) that indicates where the surface anomaly is located on the object and/or region of interest.

Methods 300 optionally include training the image translation model at 302. The training includes feeding the image translation model training data (e.g., training data 20) comprising EMR profiles of the object, an identical object, and/or a similar object, as described above in FIG. 2. Further, in some examples, the training includes binning the training data as described above in FIG. 2. Methods 400 for performing this training at 302 are described in more detail in FIG. 4.

FIG. 4 illustrates methods 400 for training an image translation model (e.g., image translation model 119), one or more of which are executed in methods 300 of FIG. 3 at 302, in some examples. Methods 400 include receiving the training data at 402, binning the training data based on object physical characteristics and/or ambient conditions at 404, and generating image translation sub-models based on the binned training data at 406. As described above in FIG. 2, the ambient conditions include one or more of ambient temperature, ambient humidity, and ambient lighting. In some examples, the binning at 404 is performed in the manner described above in FIG. 2. For example, the training data is first sorted, filtered, grouped, binned, and/or otherwise organized based on the region of interest of the object (the actual part/portion of the object being inspected for surface anomalies). The training data also or alternatively is sorted, filtered, grouped, binned, and/or otherwise organized based on one or more physical characteristics of the region of interest (e.g., paint color, composition, parts, etc.). Then, the training data is binned based on the ambient conditions. The training data includes EMR profiles of the object, including EMR profiles of the region of interest, at varying ambient conditions (e.g., varying ambient temperatures). In some examples, images taken under similar ambient conditions are grouped together in bins and each sub-model is trained on only one of the bins, as described above in FIG. 2. Thus, in some such example, the generating at 406 comprises generating each sub-model based on EMR profiles from a unique bin.

In some examples, the image translation model is a bidirectional model, and the training includes reconstructing the training EMR profile to check, validate, and/or update the image translation model. As described above, the reconstructing includes generating a synthetic reconstruction EMR profile based on the synthetic EMR profile generated by another generator. In some such examples, the synthetic reconstruction EMR profile is the same EMR profile type as the training EMR profile fed to the generator that generated the synthetic EMR profile. As an example, when a first generator (e.g., first generator 132) is fed a training EMR profile of a first type (e.g., first type 22) from a pair of time-paired EMR profiles (e.g., time-paired EMR profiles 122) of training data (e.g., training data 20), the reconstructing includes generating a synthetic reconstruction EMR profile of the first type based on the synthetic EMR profile of the second type generated by the first generator based on the training EMR profile of the first type.

In some such examples, the training further includes checking, validating, and/or updating the image translation model based on the synthetic reconstruction EMR profile and/or one or more loss functions. In some such examples, the training includes determining the one or more loss functions based on the synthetic reconstruction EMR profile. In some examples, the checking, validating, and/or updating the image translation model includes comparing the synthetic reconstruction EMR profile of the first type to the training EMR profile of the first type to determine the reconstruction loss. Additionally or alternatively, the training includes comparing the synthetic EMR profile of the second type (the synthetic EMR profile generated by the first generator) to the other training EMR profile of the pair of time-paired EMR profile (the training EMR profile of the pair of training EMR profiles that comprises the second EMR profile type). These two EMR profiles are compared to determine the discriminator loss. As examples, a reconstruction loss is the squared error between the synthetic reconstruction EMR profile and the training EMR profile, and a discriminator loss is the squared error between the synthetic EMR profile and the other type of EMR profile of the time-paired EMR training profile pair. In some such examples, a total loss equals a discriminator loss plus a reconstruction loss. In this way, As used herein, one or more computing device(s) may include, or be configured to read, non-transitory computer readable storage, or memory, media suitable for storing computer-executable instructions, or software, for implementing methods or steps of methods according to the present disclosure. Examples of such media include CD-ROMs, disks, hard drives, solid-state drives, flash memory, etc. As used herein, storage, or memory, devices and media having computer-executable instructions as well as computer-implemented methods and other methods according to the present disclosure are considered to be within the scope of subject matter deemed patentable in accordance with Section 101 of Title 35 of the United States Code.

Illustrative, non-exclusive examples of inventive subject matter according to the present disclosure are described in the following enumerated paragraphs:

A. A computer-implemented method (300) for detecting surface anomalies on an object (50), the method (300) comprising:

receiving (304) two or more measured electromagnetic radiation (EMR) profiles for the object (50), wherein at least one EMR profile of the two or more measured EMR profiles is captured by one or more EMR receivers (32, 34) at a first set of ambient conditions, and wherein at least one other EMR profile of the two or more measured EMR profiles is captured by at least one of the one or more EMR receivers at a second set of ambient conditions, wherein the second set of ambient conditions is different than the first set of ambient conditions;

generating (308) two or more synthetic EMR profiles (125) for the object (50) based on the two or more measured EMR profiles;

determining (310) whether the object (50) contains a surface anomaly based on the two or more measured EMR profiles and the two or more synthetic EMR profiles (125); and responsive to determining that the object (50) contains a surface anomaly, indicating (312) the surface anomaly to a user via a display unit (11).

A1. The method (300) of paragraph A, wherein the determining (310) whether the object (50) contains a surface anomaly is based on the first set of ambient conditions and the second set of ambient conditions, and wherein the first set of ambient conditions and the second set of ambient conditions are different in that they comprise one or more of: different ambient temperatures, different ambient humidities, different ambient pressures, different ambient precipitation conditions, and different ambient lighting conditions.

A1.1. The method (300) of paragraph A1, wherein the different ambient lighting conditions comprise one or more of different light intensities, different light orientations, different light variations, different light patterns, and different light sequences.

A1.2. The method (300) of any of paragraphs A-A1.1, wherein the determining (310) whether the object (50) contains a surface anomaly is based on one or more physical characteristics of the object (50).

A1.2.1. The method (300) of paragraph A1.2, wherein the one or more physical characteristics of the object comprise one or more of a shape, a color, a material composition, a surface coating, and one or more reflective properties of the object (50).

A1.3. The method (300) of any of paragraphs A-A1.2.1, wherein the determining (310) whether the object (50) contains a surface anomaly is based on a location of a region of interest (52) of the object (50).

A1.3.1. The method (300) of paragraph A1.3, wherein the region of interest (52) comprises one or more of a part, section, localized portion, and/or region of the object (50).

A1.3.2. The method (300) of any of paragraphs A1.3-A1.3.1, wherein the determining (310) whether the object (50) contains a surface anomaly based on the location of the region of interest (52) of the object (50) is based on one or more of one or more parts included in the region of interest (52), and one or more physical characteristics of the one or more parts.

A1.3.3. The method (300) of paragraph A1.3.2, wherein the one or more physical characteristics of the one or more parts comprise one or more of a shape, a color, a material composition, a surface coating, and one or more reflective properties of one or more parts.

A1.3.4. The method (300) of any of paragraphs A1.3-A1.3.3, wherein the object (50) comprises an aircraft (51), and wherein the region of interest (52) is a portion of the aircraft (51).

A2. The method (300) of any of paragraphs A-A1.3.4, wherein, together and/or separately, the two or more measured EMR profiles and the two or more synthetic EMR profiles (125) comprise different types of EMR profiles (22, 24) that comprise different ranges of wavelengths.

A2.1. The method (300) of paragraph A2, wherein the different types of EMR profiles (22, 24) comprise a first type of EMR profile (22) comprising a first range of wavelengths and a second type (24) of EMR profile comprising a second range of wavelengths, wherein the first range of wavelengths and the second range of wavelengths are different.

A2.2. The method (300) of paragraph A.2.1, wherein the first range of wavelengths is within the visible light spectrum and wherein the second range of wavelengths is within the infrared spectrum.

A3. The method (300) of any of paragraphs A-A2.2, wherein the generating (308) the two or more synthetic EMR profiles (125) for the object (50) based on the two or more measured EMR profiles comprises converting each of the measured EMR profiles to a different type of EMR profile.

A3.1 The method (300) of paragraph A3 when depending from any of paragraphs A2.1-A2.2, wherein the converting each of the two or more measured EMR profiles to the different type of EMR profile comprises converting the first type of EMR profile (22) to the second type of EMR profile (24) and/or converting the second type of EMR profile (24) to the first type of EMR profile (22).

A4. The method (300) of any of paragraphs A-A3.1, wherein the two or more synthetic EMR profiles (125) are generated by an image translation model (119).

A4.1. The method (300) of paragraph A4 when depending from any of paragraphs A3-A3.1, wherein the converting of each of the two or more measured EMR profiles to the different type of EMR profile is performed by the image translation model (119).

A4.2. The method (300) of any of paragraphs A4-A4.1, wherein the image translation model (119) comprises a generative adversarial network (GAN).

A5. The method (300) of any of paragraphs A4-A4.2, further comprising training (302) the image translation model (119).

A6. The method (300) of paragraph A5, wherein the training (302) the image translation model (119) comprises binning (402) training EMR profiles (20) into a plurality of bins (112).

A6.1. The method (300) of paragraph A6 when depending from any of paragraphs A1-A1.3.4, wherein the binning (402) is based on one or more ambient conditions.

A6.1.1. The method (300) of paragraph A6.1, wherein the one or more ambient conditions include one or more of ambient temperature, ambient humidity, ambient pressure, ambient lighting conditions, and ambient precipitation.

A6.2. The method (300) of any of paragraphs A6-A6.1 when depending from any of paragraphs A1.3-A1.3.4, wherein the binning (402) is based on the location of the region of interest (52).

A6.3. The method (300) of any of paragraphs A6-A6.2 when depending from any of paragraphs A1.2-A1.2.1, wherein the binning (402) is based on the one or more physical characteristics of the object (50).

A6.4. The method (300) of any of paragraphs A6-A6.3, wherein the training (302) the image translation model (119) comprises conditioning the image translation model (119) with the binned training EMR profiles.

A7. The method (300) of any of paragraphs A-A6.2, wherein the generating (308) the two or more synthetic EMR profiles (125) further comprises determining a likelihood that one or more of the synthetic EMR profiles (125) are valid.

A8. The method (300) of any of paragraphs A1.3-A7 when depending from any of paragraphs A1-A1.2, further comprising measuring the first set of ambient conditions and/or the second set of ambient conditions via one or more ambient condition sensors (42, 44, 46).

A8.1. The method (300) of paragraph A8, wherein the one or more ambient condition sensors (42, 44, 46) comprise one or more of an ambient temperature sensor (42), an ambient humidity sensor (44), and an ambient lighting sensor (46).

A9. The method (300) of any of paragraphs A-A8, wherein the surface anomalies comprise one or more of a protrusion, an indentation, a hole, a gap, and a discoloration.

A10. The method (300) of any of paragraphs A-A9, wherein the determining (310) whether the object (50) contains a surface anomaly based on the two or more measured EMR profiles and the two or more synthetic EMR profiles (125) includes comparing the two or more measured EMR profiles and the two or more synthetic EMR profiles (125) to an ambient condition-varying gradient of control EMR profiles.

B. A method (300) for detecting surface anomalies on an object (50), the method (300) comprising:
 receiving (304) two or more images of the object (50) taken at different ambient conditions by one or more cameras (32, 34), the two or more images comprising one or more of two different image types (22, 24);
 calculating (308), for each of the two or more images, a paired image (125), wherein the paired image (125) comprises the other of the two different image types (22, 24); and
 determining (310) whether the object (50) contains a surface anomaly based on the received two or more images and the calculated paired images (125).

B1. The method (300) of paragraph B, further comprising capturing the two or more images with the one or more cameras (32, 34).

B2. The method (300) of any of paragraphs B-B1, wherein the one or more cameras (32, 34) comprise an optical camera (32) and a thermal camera (34).

B3. The method (300) of any of paragraphs B-B2, further comprising receiving (304) measurements of the different ambient conditions.

B3.1. The method (300) of paragraph B3, further comprising measuring the different ambient conditions via one or more ambient condition sensors (42, 44, 46).

B3.2. The method (300) of any of paragraphs B3-B3.1, wherein the different ambient conditions include one or more of ambient temperature, ambient humidity, ambient lighting, and ambient precipitation.

B4. The method (300) of any of paragraphs B3-B3.2, wherein the determining (310) whether the object (50) contains a surface anomaly is based on the received measurements of the ambient temperature and the one or more other ambient conditions.

B5. The method (300) of any of paragraphs B-B4, wherein the determining (310) whether the object (50) contains a surface anomaly is based on a location of a region of interest (52) and/or one or more object physical characteristics.

B5.1. The method (300) of paragraph B5, wherein the one or more object characteristics comprise one or more of a type of the object, a composition of the object, and a surface coating of the object.

B5.2. The method (300) of any of paragraphs B5-B5.1, wherein the object (50) comprises an aircraft part and wherein the one or more object physical characteristics comprise one or more aircraft part characteristics.

B6. The method (300) of any of paragraphs B-B5.2, wherein the calculating (308) the paired image is performed by an image translation model (119).

B6.1. The method (300) of paragraph B6, wherein the image translation model (119) comprises a bidirectional generative adversarial network (GAN).

B7. The method (300) of any of paragraphs B6-B6.1, further comprising training (302) the image translation model (119).

B7.1. The method (300) of paragraph B7, wherein the training (302) the image translation model (119) comprises binning (402) training data (20) based on one or more ambient conditions.

B7.1.1. The method (300) of paragraph B7.1, wherein the one or more ambient conditions include one or more of ambient temperature, ambient humidity, and ambient lighting.

B7.2. The method (300) of paragraph B7.1, wherein the image translation model (119) comprises two or more sub-models (120), and wherein the training the image translation model (119) further comprises conditioning each of the two or more sub-models (120) with different bins (112) of training data (20).

B7.3. The method (300) of paragraph B7.2, wherein the calculating (308) the paired images (125) comprises selecting one of the two or more sub-models (120) to perform the calculating based on the ambient temperature and the one or more other ambient conditions.

B8. The method (300) of any of paragraphs B-B7.3, wherein the two different image types (22, 24) comprise a first image type (22) comprising a first range of wavelengths and a second image type (24) comprising a second range of wavelengths, wherein the first range of wavelengths and the second range of wavelengths are different.

B8.1. The method (300) of paragraph A8, wherein the first range of wavelengths is within the visible light spectrum and wherein the second range of wavelengths is within the infrared spectrum.

B9. The method (300) of any of paragraphs B-B8.1, wherein the surface anomalies comprise one or more of a protrusion, an indentation, a hole, a gap, and a discoloration.

B10. The method (300) of any of paragraphs B-B9, wherein the determining (310) whether the object (50) contains a surface anomaly based on the received two or more images and the calculated paired images (125) includes comparing the received two or more images and the calculated paired images (125) to control images.

C. A method (300) for detecting surface anomalies on an object (50), the method (300) comprising:
receiving (302) a first image of the object (50) taken at a first set of ambient conditions, the first image comprising a first image type (22);
receiving (302) a second image of the object (50) taken at a second set of ambient conditions, the second set of ambient conditions different than the first set of ambient conditions, wherein the second image comprises the first image type (22) or a second image type (24), the second image type (24) different than the first image type (22);
calculating (308) a third image of the object taken at the first set of ambient conditions based on the first image, the third image comprising the second image type (24);
calculating (308) a fourth image of the object (50) taken at the second set of ambient conditions based on the second image, wherein the fourth image comprises the second image type (24) when the second image comprises the first image type (22), and wherein the fourth image comprises the first image type (22) when the second image comprises the second image type (24); and
determining (310) whether the object (50) contains a surface anomaly based on the first image, the second image, the third image, and the fourth image.

C1. The method (300) of paragraph C, further comprising the subject matter of any of paragraphs A-B10.

D. A method (300) for detecting surface anomalies on an object (50), the method (300) comprising:
receiving (304) unpaired image data from one or more cameras;
calculating (308) missing image data (125) to generate paired image data; and
determining (310) whether the object (50) contains a surface anomaly based on the paired image data.

D1. The method (300) of paragraph D, further comprising receiving ambient condition measurements via one or more ambient condition sensors (42, 44, 46).

D2. The method (300) of paragraph D1, wherein the calculating (308) the missing image data (125) to generate the paired image data comprises compensating for effects caused by changes in the ambient conditions.

E. A system (8) comprising:
a computing device (10) comprising:
non-transitory memory (18) comprising computer-readable instructions (19) for:
receiving (304) unpaired image data of an object (50) of two different image types representing two different wavelength ranges of electromagnetic radiation (EMR);
predicting (308) missing image data to generate paired image data of the two different image types; and
determining (310) whether the object (50) contains a surface anomaly based on the paired image data; and
a processing unit (12) configured to execute the computer-readable instructions (19).

E1. The system (8) of paragraph E, further comprising two different cameras (32, 34) configured to capture the two different image types.

E2. The system (8) of any of paragraphs E-E1, further comprising one or more ambient condition sensors (42, 44, 46) configured to measure one or more ambient conditions.

E2.1. The system (8) of paragraph E2, wherein the one or more ambient condition sensors (42, 44, 46) include one or more of a temperature sensor (42) configured to measure ambient temperature, a light sensor (46) configured to measure one or more lighting characteristics, and a humidity sensor (44) configured to measure ambient humidity.

E3. The system (8) of paragraph E2, wherein the non-transitory memory (18) of the computing device further comprises computer-readable instructions (19) for adjusting the predicted missing image data based on changes in one or more of the measured ambient conditions.

E4. The system (8) of any of paragraphs E-E3, further comprising a display (11) configured to indicate to a user whether the object contains a surface anomaly.

E5. The system (8) of paragraph E4, wherein the display (11) is configured to indicate one or more of a location of the surface anomaly, a type of the surface anomaly, and a morphology and/or geometry of the surface anomaly to the user.

E6. The system (8) of any of paragraphs E-E5, further comprising the subject matter of any of paragraphs A-D2.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A computer implemented method for detecting surface anomalies on an object, the method comprising:
   receiving two or more measured electromagnetic radiation (EMR) profiles for the object, wherein at least one EMR profile of the two or more measured EMR profiles is captured by one or more EMR receivers at a first set of ambient conditions, and wherein at least one other EMR profile of the two or more measured EMR profiles is captured by at least one of the one or more EMR receivers at a second set of ambient conditions, wherein the second set of ambient conditions is different than the first set of ambient conditions in one or more of ambient temperature, ambient humidity, ambient pressure, or ambient precipitation condition;
   generating, with a trained image translation model, two or more synthetic EMR profiles for the object based on the two or more measured EMR profiles;
   determining whether the object contains a surface anomaly based on the two or more measured EMR profiles, the two or more synthetic EMR profiles, the first set of ambient conditions, and the second set of ambient conditions; and
   responsive to the determining that the object contains a surface anomaly, indicating the surface anomaly to a user via a display unit.

2. The method of claim 1, wherein the first set of ambient conditions and the second set of ambient conditions further are different n ambient lighting condition.

3. The method of claim 2, wherein the first set of ambient conditions and the second set of ambient conditions are different in light intensity, light orientation, light variation, light patterns, or light sequence.

4. The method of claim 1, wherein the determining whether the object contains a surface anomaly is based on one or more physical characteristics of the object, wherein the one or more physical characteristics of the object comprise one or more of a shape, a color, a material composition, a surface coating, and one or more reflective properties of the object.

5. The method of claim 1, wherein the determining whether the object contains a surface anomaly is based on a location of a region of interest of the object.

6. The method of claim 5, wherein the object is an aircraft, and wherein the region of interest is a portion of the aircraft, and wherein the determining whether the object contains a surface anomaly based on the location of the region of interest is based on one or more of one or more parts included in the region of interest, a composition of the one or more parts, and a surface coating of the one or more parts.

7. The method of claim 1, wherein, together or separately, the two or more measured EMR profiles and the two or more synthetic EMR profiles comprise different types of EMR profiles that represent different ranges of wavelengths.

8. The method of claim 7, wherein the different types of EMR profiles comprise a first type of EMR profile that represents a first range of wavelengths and a second type of EMR profile that represents a second range of wavelengths, wherein the first range of wavelengths is different than the second range of wavelengths.

9. The method of claim 8, wherein the generating the two or more synthetic EMR profiles for the object based on the two or more measured EMR profiles comprises one or more of converting the first type of EMR profile to the second type of EMR profile and converting the second type of EMR profile to the first type of EMR profile.

10. The method of claim 1, further comprising training an untrained image translation model to generate the trained image translation model.

11. The method of claim 10, wherein the training the untrained image translation model comprises binning two or more training EMR profiles based on one or more of one or more ambient conditions, a location of a region of interest of the object, and one or more physical characteristics of the object.

12. The method of claim 1, wherein the determining whether the object contains a surface anomaly based on the two or more measured EMR profiles and the two or more synthetic EMR profiles comprises comparing the two or more measured EMR profiles and the two or more synthetic EMR profiles to two or more control EMR profiles of an anomaly-free object.

13. A method for detecting surface anomalies on an object, the method comprising:
   receiving two or more images of the object taken at different ambient conditions by one or more cameras, the two or more images comprising one or more of two different image types, wherein the different ambient conditions comprise one or more of different ambient temperatures or different ambient humidities;
   calculating, with a trained image translation model, for each of the two or more images, a paired image, wherein the paired image comprises the other of the two different image types; and
   determining whether the object contains a surface anomaly based on the received two or more images, the calculated paired images, and the different ambient conditions.

14. The method of claim 13, wherein the different ambient conditions further comprise different ambient lighting conditions.

15. The method of claim 13, wherein the determining whether the object contains a surface anomaly is based on a location of a region of interest and one or more physical characteristics of the object at the region of interest.

16. The method of claim 13, wherein the method further comprises creating the trained image translation model by training an untrained image translation model, wherein the training comprises binning training data based on one or more ambient conditions.

17. The method of claim 16, wherein the trained image translation model comprises two or more sub-models, and wherein the training the untrained image translation model further comprises conditioning each of the two or more sub-models with different bins of training data, and wherein the calculating the paired image comprises selecting one of the two or more sub-models to perform the calculating based on the different ambient conditions at which the two or more images were taken and the one or more ambient conditions on which the untrained image translation model was trained.

18. A system comprising:
    a computing device comprising:
        non-transitory memory comprising computer-readable instructions for:
            receiving unpaired image data of an object, the unpaired image data comprising two different image types representing two different wavelength ranges of electromagnetic radiation (EMR);
            predicting missing image data to generate paired image data of the two different image types;
            determining whether the object contains a surface anomaly based on the paired image data;
            adjusting the predicted missing image data based on changes in one or more ambient conditions, wherein the one or more ambient conditions comprise one or more of ambient temperature, ambient lighting, and ambient humidity; and
    a processing unit configured to execute the computer-readable instructions.

19. The system of claim 18, further comprising a display configured to indicate to a user whether the object contains the surface anomaly, and wherein the display is configured to indicate one or more of a location of the surface anomaly, a type of the surface anomaly, and a morphology or geometry of the surface anomaly to the user.

20. The method of claim 10, wherein the trained image translation model comprises two or more sub-models, and wherein the training the untrained image translation model further comprises binning training data based on one more ambient conditions and conditioning each of the two or more sub-models with different bins of training data, and wherein the generating two or more synthetic EMR profiles comprises selecting at least one of the two or more sub-models to perform the generating based on the different ambient conditions at which the two or more images were taken and the one or more ambient conditions on which the untrained image translation model was trained.

* * * * *

UNITED STATES PATENT AND TRADEMARK OFFICE
CERTIFICATE OF CORRECTION

| | |
|---|---|
| PATENT NO. | : 11,599,986 B2 |
| APPLICATION NO. | : 16/902588 |
| DATED | : March 7, 2023 |
| INVENTOR(S) | : Amir Afrasiabi and William David Kelsey |

It is certified that error appears in the above-identified patent and that said Letters Patent is hereby corrected as shown below:

In the Claims

Column 27, Line 56, "n" should be changed to --in--.

Signed and Sealed this
First Day of August, 2023

Katherine Kelly Vidal
*Director of the United States Patent and Trademark Office*